(12) United States Patent
Mattsson (10) Patent No.: US 10,571,592 B2
(45) Date of Patent: Feb. 25, 2020

(54) DIRECT RESISTIVITY DETERMINATION

(71) Applicant: PGS Geophysical AS, Oslo (NO)

(72) Inventor: Johan Mattsson, Kista (SE)

(73) Assignee: PGS Geophysical AS, Oslo (NO)

( * ) Notice: Subject to any disclaimer, the term of this patent is extended or adjusted under 35 U.S.C. 154(b) by 239 days.

(21) Appl. No.: 15/178,999

(22) Filed: Jun. 10, 2016

(65) Prior Publication Data

US 2017/0059734 A1 Mar. 2, 2017

Related U.S. Application Data

(60) Provisional application No. 62/212,234, filed on Aug. 31, 2015.

(51) Int. Cl.
*G01V 3/08* (2006.01)
*G01V 1/38* (2006.01)
*G01V 3/17* (2006.01)

(52) U.S. Cl.
CPC ............ *G01V 3/083* (2013.01); *G01V 1/3808* (2013.01); *G01V 3/17* (2013.01); *G01V 2003/086* (2013.01)

(58) Field of Classification Search
CPC ........ G01V 3/083; G01V 1/3808; G01V 3/17; G01V 2003/086
USPC .......................................................... 702/2
See application file for complete search history.

(56) References Cited

U.S. PATENT DOCUMENTS

| | | | | |
|---|---|---|---|---|
| 4,594,552 A | * | 6/1986 | Grimaldi | G01V 11/005 324/374 |
| 4,692,707 A | * | 9/1987 | Locke | G01V 3/24 324/347 |
| 5,355,088 A | * | 10/1994 | Howard, Jr. | G01V 3/28 324/339 |
| 5,390,110 A | * | 2/1995 | Cheney | A61B 5/0536 600/407 |
| 7,126,338 B2 | | 10/2006 | MacGregor et al. | |
| 7,502,690 B2 | * | 3/2009 | Thomsen | G01V 3/083 367/21 |
| 7,558,706 B1 | * | 7/2009 | Hoyler | G06F 17/5018 324/457 |
| 7,660,480 B1 | * | 2/2010 | Wu | G06T 17/20 345/419 |
| 2002/0122254 A1 | * | 9/2002 | Gluckstad | G02B 27/46 359/559 |

(Continued)

FOREIGN PATENT DOCUMENTS

| | | | |
|---|---|---|---|
| CN | 102966349 A | * | 3/2013 |
| WO | 2006052145 | | 5/2006 |
| WO | 2007126481 | | 11/2007 |

OTHER PUBLICATIONS

J. Chen and et al, "A new formula to compute apparent resistivities from marine magnetometric resistivity data", Geophysics, vol. 71, No. 3 (May-Jun. 2006):P. G73-G81 (supplied in IDS).*

(Continued)

*Primary Examiner* — Janet L Suglo
*Assistant Examiner* — Douglas Kay (57) ABSTRACT

A resistivity profile can be generated directly from measured electromagnetic field data from a marine survey. A series of transformations can be applied to remove a conductivity dependency from a boundary value problem such that an inversion method may no longer be required to generate the resistivity profile.

18 Claims, 4 Drawing Sheets

(56) References Cited

U.S. PATENT DOCUMENTS

| | | | | |
|---|---|---|---|---|
| 2003/0163258 | A1* | 8/2003 | Haugland | G01V 3/28 |
| | | | | 702/6 |
| 2004/0010373 | A1* | 1/2004 | Smits | G01V 1/50 |
| | | | | 702/6 |
| 2005/0198599 | A1* | 9/2005 | Sercu | G06F 17/5036 |
| | | | | 716/136 |
| 2009/0006053 | A1* | 1/2009 | Carazzone | G01V 3/083 |
| | | | | 703/5 |
| 2010/0185393 | A1* | 7/2010 | Liang | G01V 3/28 |
| | | | | 702/7 |
| 2011/0108283 | A1 | 5/2011 | Srnka et al. | |
| 2013/0300420 | A1* | 11/2013 | Juhasz | G01V 3/083 |
| | | | | 324/365 |
| 2014/0266215 | A1* | 9/2014 | Bjornemo | G01V 3/12 |
| | | | | 324/365 |
| 2015/0081219 | A1* | 3/2015 | Pugh | G01V 3/12 |
| | | | | 702/2 |
| 2016/0282502 | A1* | 9/2016 | Sharma | G01V 3/26 |
| 2016/0313465 | A1* | 10/2016 | Sollner | G01V 1/364 |
| 2016/0313468 | A1* | 10/2016 | Du | G01V 11/00 |

OTHER PUBLICATIONS

F. Jones, "DC resistivity surveys", UBC Earth and Ocean Sciences, Jan. 5, 2007.*

Michael S. Zhdanov, "Geophysical electromagnetic theory and methods", Elsevier, First Edition 2009, ISBN: 978-0-444-52963-3)—chapter 6 relevant pages.*

Yagle (Andrew E Yagle, "A Layer Stripping Fast Algorithm for the TwoDimensional Direct Current Inverse Resistivity Problem", IEEE Transactions on Geoscience and Remote Sensing, vol. GE-25, No. 5, Sep. 1987).*

Flekkoy (Erik Flekkoy, "Understanding electro-magnetic surveys", Geo ExPro, vol. 6, No. 4, 2009).*

Timonov, et al., "An Efficient Algorithm for Solving the Inverse Problem of Locating the Interfaces Using the Frequency Sounding Data", Journal of Computational Physics; Received Sep. 5, 2001; revised Sep. 4, 2002 (16 pgs).

Klibanov, et al., "Numerical studies on the globally convergent convexification algorithm in 2D", Institute of Physics Publishing; Received Sep. 28, 2006, Published Dec. 5, 2006 (16 pgs).

Krylstedt, et al., "A sequential approach to inverse modelling in marine electromagnetics: Recovering the conductivity profile from measurements of electromagnetic field", (2001) (8 pgs).

Siemon, "Improved and new Resistivity-depth profiles for Helicopter Electromagnetic Data"; Journal of Applied Geophysics, vol. 46, (2001) (pp. 65-76) (12 pgs).

Edwards, "Marine Controlled Source Electromagnetics: Principles, Methodologies, Future Commercial Applications"; Surveys in Geophysics; vol. 26, (May 25, 2005) (pp. 675-700) (26 pgs).

Key, "1D Inversion of Multicomponent, Multifrequency Marine CSEM Data: Methodology and Synthetic Studies for Resolving Thin Resistive Layers"; Geophysics, vol. 74, No. 2. (Mar.-Apr. 2009) (pp. F-9-F20) (12 pgs).

Chen, et al., "A New Formula to Compute Apparent Resistivities From Marine Magnetometric Resistivity Data"; Geophysics, vol. 71, No. 3, (May-Jun. 2006) (pp. G73-G81) (9 pgs).

Extended European Search Report for Related European Application No. 16186030.9, dated Jan. 26, 2017 (10 pgs).

1st Mexican Office Action for related Mexican Application MX/A/2016/011258, dated Mar. 20, 2019 (Original and Translation Copy Attached) (8 pages total).

\* cited by examiner

DIRECT RESISTIVITY DETERMINATION

CROSS-REFERENCE TO RELATED APPLICATIONS

This application claims priority to U.S. Provisional Application 62/212,234, filed Aug. 31, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

The present disclosure is related to generating a resistivity profile directly from measured electromagnetic (EM) field data. The measured EM field data can be acquired from a measured EM field. Some methods for generating a resistivity profile may require an iterative computation modeling process, such as an inversion. This iterative process may take many hours to yield a resistivity profile. It would be advantageous if a resistivity profile could be generated directly from measured EM field data using a non-iterative computation modeling process, such as an inversion. At least one embodiment of the present disclosure can generate a resistivity profile directly from measured EM field data using a non-iterative computation modeling process. That is, an inversion may not be required. In at least one instance, the resistivity profile can be generated by applying a series of transformations to the measured EM field data.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
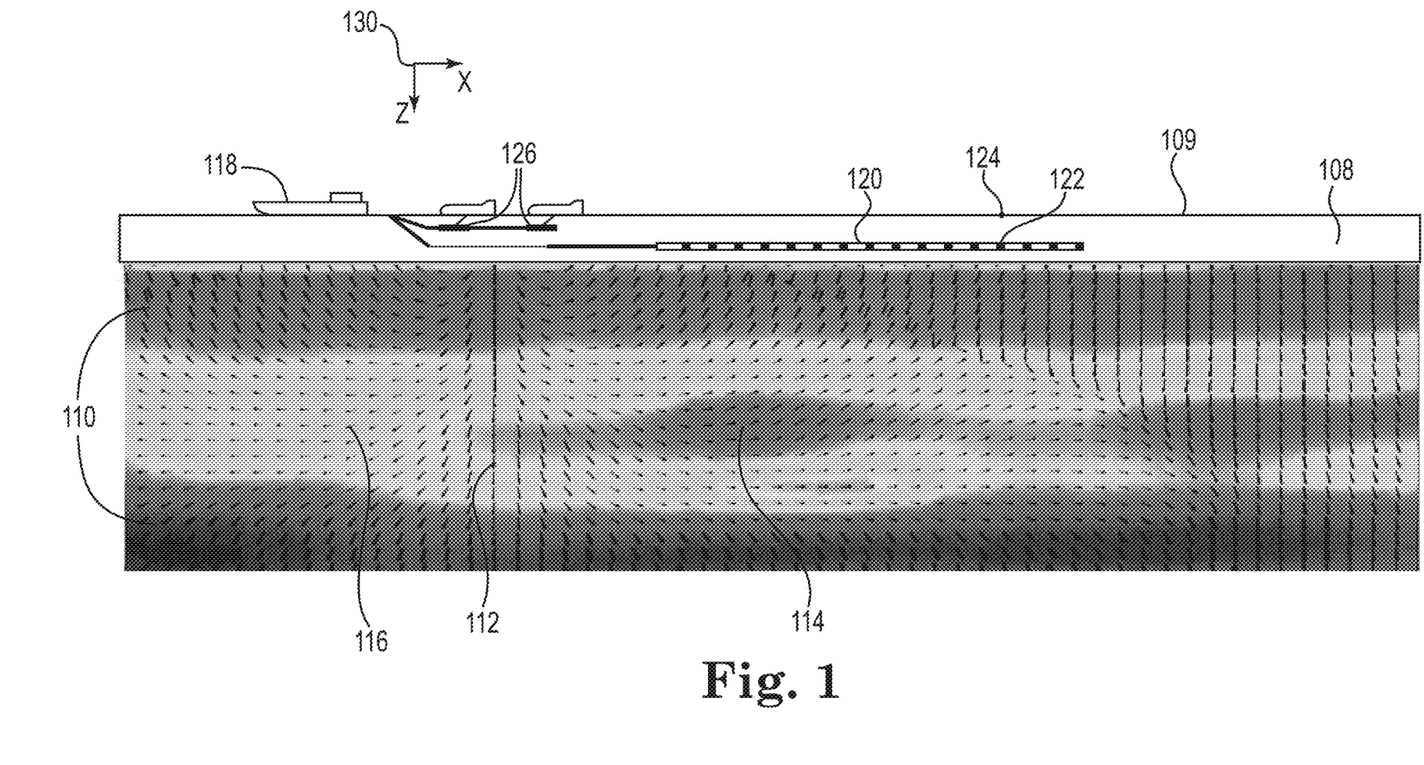
FIG. 1 illustrates an elevation or xz-plane view of marine surveying in which an electric current is injected into a fluid volume by a dipole source for recording by electromagnetic receivers.

FIG. 1 illustrates an elevation or xz-plane 130 view of marine surveying in which an electric current is injected into a fluid volume 108 a dipole source 126 for recording by electromagnetic receivers 122. Processing and analysis of data from injecting the electric current can be performed in order to help characterize the structures and distributions of features and materials underlying the surface of the earth. For example, such processing can include generating a resistivity profile directly from measured EM field data as described herein.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines, such as electrical, optical fiber, etc., to which receivers may be coupled. In one type of marine survey, each receiver, such as receiver 122, comprises an electromagnetic receiver that detects electromagnetic energy within the water. In another type of marine survey, receivers on one or more streamers 120, such as receiver 122, can be a combination of electromagnetic receivers and seismic receives, such as hydrophones or geophone sensors, such that one or more streamers 120 can be used in both electromagnetic surveys and seismic surveys. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more sources 126 that produce signals as the marine survey vessel 118 and streamers 120 move across the sea surface 109. Sources 126 and/or streamers 120 may also be towed by other vessels, or may be otherwise disposed in fluid volume 108. For example, receivers may be located on ocean bottom cables or nodes fixed at or near the surface 109, and sources 126 may also be disposed in a nearly-fixed or fixed configuration.

FIG. 1 shows the energy flux 112 and 116 (displayed as arrows) resulting from the electric current injected by the dipole source 126 and a subsurface resistivity profile 110 from an inversion (indicated by the shading). A change in the resistivity profile may indicate a change in the geology of the subsurface. For example, the darker shading 114 surrounded by lighter shading may be indicative of hydrocarbons in the subsurface.

A purpose of Controlled Source ElectroMagnetics (CSEM) may be to estimate the subsurface resistivity from measured EM field data. In some instances, the resistivity may be obtained by utilizing an inversion algorithm. The measured EM field data may be compared with modeled EM field data given a resistivity model in an iterative procedure. For example, an objective function may be iteratively minimized until the measured and modeled data difference is lower than a threshold value. Some examples of iterative algorithms to minimize the objective function include, but are not limited to, a regularized Gauss-Newton and various types of conjugate gradient methods. Such algorithms may be time consuming when an inversion algorithm is used for large sub-surface domains where a large amount of data is included. For example, a long survey line 100 kilometers (km) long may take many hours to invert when using a parallelized 2.5-dimensional inversion code. The computation time may be even greater for a 3-dimensional inversion of large subsurface domains. For example, a 100 km by 70 km survey area may take many days on a computer cluster with several hundred processors. The inversion results, as a consequence of high spatial data density from a receiver such as a towed sensor cable (streamer) or ocean-bottom cable EM survey, may have high resolution and may be of good quality. However, a disadvantage may be extensive computational time that may be required. Inversions may also suffer from non-uniqueness and may be ill posed. An inversion may lead to an objective function that is minimized to have several minima. Multiple inversion results may yield the same good match between modeled and measured EM data. An ill posed inversion may refer to an inversion that is unstable and may ultimately crash or fail. Therefore, it may be necessary to regularize the objective function in order to stabilize the minimization. Therefore, it can be useful to regularize the minimization algorithm to obtain a stable solution. The solution can vary with the type of regularization as well as the minimization method itself. According to at least one embodiment of the present disclosure, a resistivity profile for a subsurface domain can be determined directly from measured EM field data from a marine survey, without the utilization of an inversion algorithm.

According to at least one embodiment of the present disclosure, a resistivity profile for a source position (or "shot points") in a source array of source positions can be determined directly from measured EM field data from a marine survey, without the utilization of an inversion algorithm. A resistivity profile in depth can be generated from an explicit expression, which can be derived from a series of transformations of measured EM field data. The method can include a Hankel transformation of the measured EM field data resulting in an ordinary differential equation (ODE) with a boundary condition at a measurement point such as a measurement point along a towed streamer or an ocean-bottom cable. A boundary condition can be a constraint used in solving a boundary value problem (BVP). The BVP can be a differential equation together with one or more boundary conditions. The solution of this ODE is dependent on the resistivity profile. However, a second transformation can be applied to the ODE resulting in an integro-differential equation with a solution that is no longer dependent on the resistivity profile.

An explicit expression for determining a resistivity profile for a source directly from measured EM field data can be derived to:

$$\rho(z) = i\mu_0 \left( \int_\omega^\infty \frac{\partial^2 q(z,\tau)}{\partial z^2} d\tau - \omega \left( \int_\omega^\infty \frac{\partial q(z,\tau)}{\partial z} d\tau \right)^2 \right)^{-1} \quad (1)$$

where $\rho(z)$ is the marine environment resistivity as a function of the depth z below a receiver, $\omega$ is the angular frequency of a source, $q(z,\tau)$ is an EM field transformation function of the depth z and the angular frequency $\omega$ (see expression (8) discussed below), $\tau$ is an angular frequency variable for integrating the EM field transformation function q over the angular frequency from $\omega$ to $\infty$, (the integration variable is changed from $\omega$ to $\tau$ because $\omega$ used at the start of the integration), $\mu_0$ is the magnetic permeability of the marine environment, and i is the imaginary unit. Expression (1) can be used to generate a resistivity profile for each shot point in an array of shot points. Thus, the geometry of the sailing and/or survey pattern can be irrelevant because a resistivity profile can be generated for each shot point.

Expression (1) can be derived by starting from a vector potential $A=(A_x, 0, A_z)$ for a horizontal electric current dipole source in the x-direction (the horizontal direction in-line with the dipole source). The dipole source can be a pair of electrodes used to inject an electric current into a body of water. The electric current may interact with the structure of the marine survey equipment, which may include a marine vessel and a towed streamer. The interaction may affect an electric potential measurement. As will be appreciated by one of ordinary skill in the art, in-line refers to a field component that is tangent to a source and a receiver. In a conductive medium and at frequencies used in CSEM, the vector potential is approximately given by:

$$A = \frac{1}{i\omega\mu_0} E \quad (2)$$

where E is an EM field. A partial differential equation (PDE) for the EM field can be approximately given by:

$$\nabla^2 E(r, \omega) + i\omega\mu_0 \sigma(r) = 0 \quad (3)$$

$$\sigma(r) = \frac{1}{\rho(r)} \quad (4)$$

$$r = (x, y, z) \quad (5)$$

where r is a three-dimensional position vector in a three-dimensional (x-y-z) coordinate system as shown in FIG. 1 (the y-direction is into and out of the page) and σ(r) is the conductivity of the marine environment as a function of the position vector r.

Taking the zero-order cylindrical Hankel transformation u of the x-component of the vector potential yields:

$$u(\xi, z, \omega) = \int_0^\infty J_0(\xi s) E_x(s, z, \omega) r \, dr \quad (6)$$

where s is the radial distance from the dipole source, ξ is the Hankel transform variable, and $J_0$ is the zero-order Bessel function of the first kind. Estimating the conductivity as a function of depth z can result in the following BVP:

$$\frac{\partial^2 u(\xi, z, \omega)}{\partial z^2} - (\xi^2 - i\omega\mu_0\sigma(z))u(\xi, z, \omega) = 0, \, 0 < z < L \quad (7a)$$

$$u|_{z=0} = u_0 \quad (7b)$$

$$\frac{\partial u}{\partial z}\bigg|_{z=L} + \sqrt{\xi^2 - i\omega\mu_0\sigma(L)} \, u_{z=L} = 0 \quad (7c)$$

where $u_0$ is the Hankel transformation shown in expression (6). The boundary conditions are a measurement point at a receiver (depth z is 0) and the radiation condition at the subsurface (depth z is L). This BVP can be solved if the conductivity, which is the inverse of the resistivity, is known. However, the conductivity is often unknown and in some instances can be estimated through inversion.

To remove the conductivity dependency from BVP (7), which consists of expressions (7a), (7b), and (7c), a second transform can be applied:

$$q(\xi, z, \omega) = \frac{\partial}{\partial \omega}\left(\frac{\ln u(\xi, z, \omega)}{\omega}\right) \quad (8)$$

Applying transform (8) to BVP (7) ultimately results in expression (1), the resistivity profile. There can be several intermediary steps before reaching expression (1). First, a portion of transform (8) can be rewritten as follows:

$$\frac{\ln u(\xi, z, \omega)}{\omega} = w(\xi, z, \omega) \quad (9)$$

where w is an intermediate transform. Inserting transform (9) into expression (8) yields:

$$q(\xi, z, \omega) = \frac{\partial w(\xi, z, \omega)}{\partial \omega} \quad (10)$$

Next, u(ξ,z,ω) can be rewritten as a function of q(ξ,z,ω):

$$w(\xi, z, \omega) = -\int_\omega^\infty q(\xi, z, \tau) d\tau \Rightarrow u(\xi, z, \omega) = e^{-\omega \int_\omega^\infty q(\xi, z, \tau) d\tau} \quad (11)$$

Inserting expression (11) into expression (7a) results in expression (1), an expression for calculating a resistivity directly from measured EM field data without utilizing an inversion method. As a result of the transformation in expression (11), BVP (7) becomes:

$$\frac{\partial^2 q(z, \omega)}{\partial z^2} - 2\omega \frac{\partial q(z, \omega)}{\partial z} \int_\omega^\infty \frac{\partial q(z, \tau)}{\partial z} d\tau + \quad (12a)$$

$$\left(\int_\omega^\infty \frac{\partial q(z, \tau)}{\partial z} d\tau\right)^2 = 0,$$

$$0 < z < L$$

$$\frac{\partial q}{\partial z}\bigg|_{z=0} = \frac{\partial}{\partial \omega}\left((\omega u_0)^{-1} \frac{\partial u}{\partial z}\bigg|_{z=0}\right) \quad (12b)$$

$$\frac{\partial q}{\partial z}\bigg|_{z=L} = \frac{i\sqrt{i\mu_0\omega\sigma(L)}}{2\omega^2}, \text{ the limit value for } z = L \quad (12c)$$

$$u_0 \approx \int_0^S E_x(x, y=0, z=0, \omega) x \, dx, \quad (12d)$$

integrating an EM field along a streamer $$\frac{\partial u}{\partial z}\bigg|_{z=0} \approx \frac{\partial u_h}{\partial z}\bigg|_{z=0}, \quad (12e)$$

obtained from a model with a known seawater conductivity and σ = σ(L) in the subsurface To solve BVP (12), which consists of expressions (12a), (12b), (12c), (12d), and (12e), and obtain a boundary value, the derivatives can be estimated for a given conductivity σ(L) and then the integro-differential equation can be discretized in both z and ω. A solution to BVP (12) can be independent of σ(L) for a large depth L, which can be 3 km below the seafloor.

Figure 2:
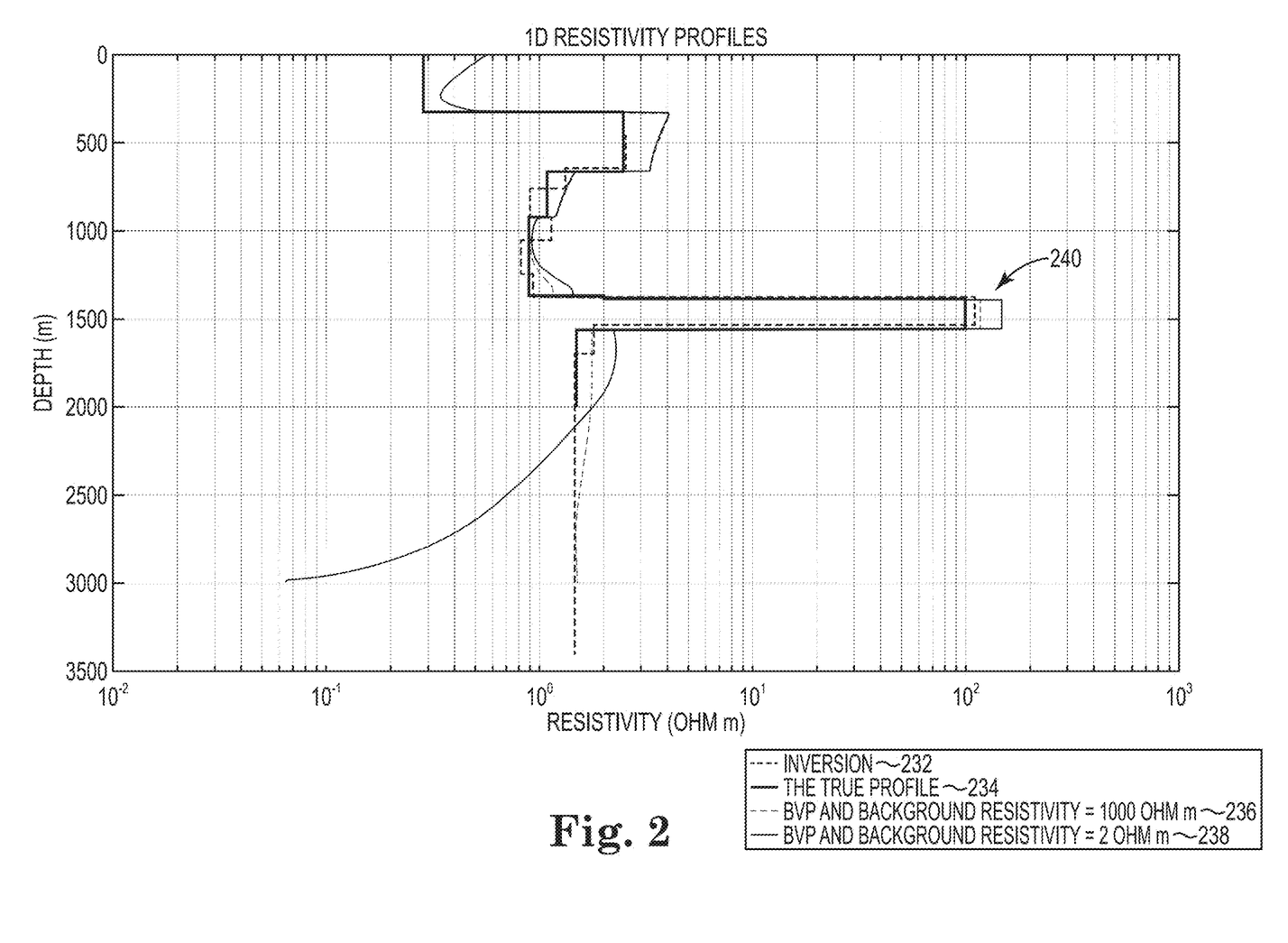
FIG. 2 shows estimated 1D resistivity profiles from an inversion and from solving a boundary value problem according to at least one embodiment of the present disclosure with two different values of background resistivity.

At least one embodiment of the present disclosure can result in resistivity profiles from expression (1) for two different values of σ(L) as shown in FIG. 2. FIG. 2 shows estimated 1D resistivity profiles from an inversion (profile 232) and from solving BVP (12) and using expression (1) according to at least one embodiment of the present disclosure with two different values of the background resistivity: 1000Ω (profile 236) and 2Ω (profile 238). A "true" profile is also shown (profile 234). The "true" profile is the assumed correct profile for the purpose of comparing the accuracy of various computational methods of arriving at a profile. In the example of FIG. 2, the source was placed 10 m below the sea-surface and the receiver points along the streamer at a 100 meters (m) depth. The frequencies ranged from 0.1-5 Hz and the offsets, the distance between a source and a receiver, reached from 1000 m to 6000 m.

FIG. 2 shows estimated 1D resistivity profiles from an inversion and from solving a BVP according to at least one embodiment of the present disclosure with two different values of background resistivity. As shown in FIG. 2, resistivity profiles 236 and 238 generated from expression (1) can agree with a "true" profile 234 as well as a profile 232 generated from an inversion. Seawater has a relatively low resistivity compared to that of hydrocarbons. Variation in the overburden, the region above the resistive anomaly, can also be captured including situations with a high resistive anomaly (refer to 240 in FIG. 2). Such a high resistive anomaly can be indicative of hydrocarbons in a subsurface. The expression (1) can be used to recover or estimate the resistivity in the subsurface from towed streamer and ocean-bottom cable EM field data. The conductivity value σ(L) can be chosen according to expected geology.

Figure 3:
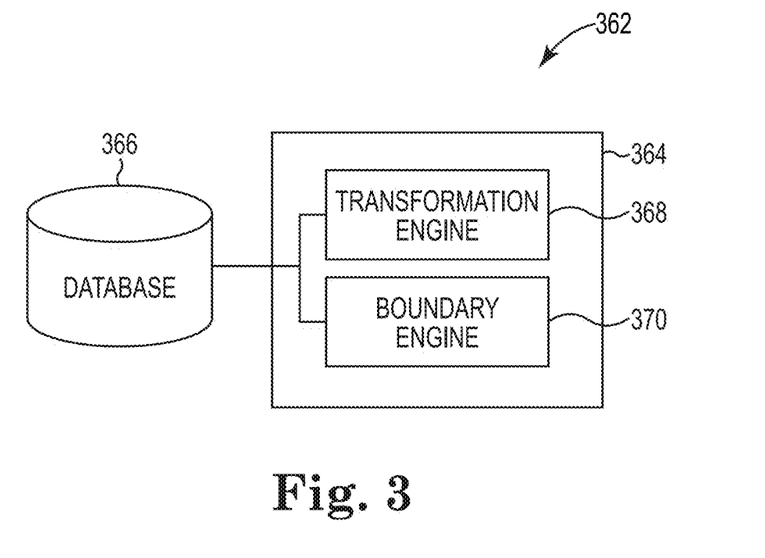
FIG. 3 illustrates a diagram of a system for generating a resistivity profile for a source directly from measured electromagnetic field data from a marine survey.

FIG. 3 illustrates a diagram of a system 362 for generating a resistivity profile for a source directly from measured EM field data from a marine survey. The system 362 can include a data store 366, a subsystem 364, and/or a number of engines, such as a transformation engine 368 and/or a boundary engine 370, and the subsystem 364 and engines can be in communication with the data store 366 via a communication link. The system 362 can include additional or fewer engines than illustrated to perform the various functions described herein. The system can represent program instructions and/or hardware of a machine such as the machine 474 referenced in FIG. 4, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The transformation engine 368 can include a combination of hardware and program instructions that is configured to apply a series of transformations to a measured EM field data to yield a BVP. The series of transformations can include a zero-order Hankel transformation and a transformation to remove a conductivity dependency. The series of transformations can be applied to an x-component of the measured EM field data, where "x" is a sailing direction. The x-component can be in-line with the at least one source and a towed sensor cable. The measurement point can be on a towed sensor cable or an ocean-bottom cable. The at least one source can comprise a pair of electrodes forming a dipole source.

The boundary engine 370 can include a combination of hardware and program instructions that is configured to determine a first boundary condition based on at least one of the series of transformations of the measured EM field data and a measurement point, apply the first boundary condition to the BVP, discretize a second boundary condition in depth and frequency, and solve the BVP according to the first and the second boundary conditions to generate a resistivity profile for at least one source. The measurement point can be on a towed sensor cable or an ocean-bottom cable. A source can be a pair of electrodes comprising a dipole source.

In at least one embodiment, the system 362 can also include the profile engine. The profile engine can include a combination of hardware and program instructions that is configured to receive solutions to the BVP at a plurality of measurement points and generate a resistivity profile for a surveyed area.

Figure 4:
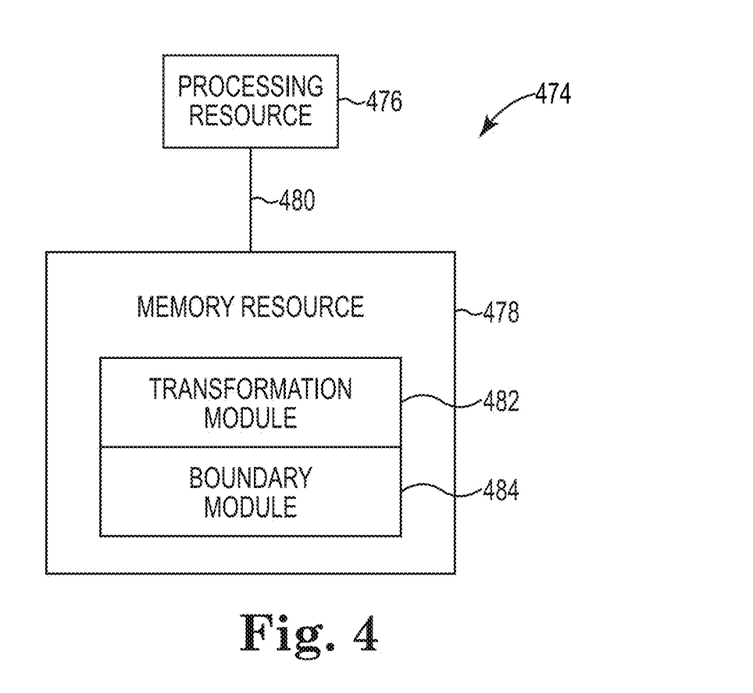
FIG. 4 illustrates a diagram of a machine for generating a resistivity profile for a source directly from measured electromagnetic field data from a marine survey.

FIG. 4 illustrates a diagram of a machine 474 for generating a resistivity profile for a source directly from measured EM field data from a marine survey. The machine 474 can utilize software, hardware, firmware, and/or logic to perform a number of functions. The machine 474 can be a combination of hardware and program instructions configured to perform a number of functions and/or actions. The hardware, for example, can include a number of processing resources 476 and a number of memory resources 478, such as a machine-readable medium or other non-transitory memory resources 478. The memory resources 478 can be internal and/or external to the machine 474, for example, the machine 474 can include internal memory resources and have access to external memory resources. The program instructions, such as machine-readable instructions, can include instructions stored on the machine-readable medium to implement a particular function, for example, an action such as generating a resistivity profile for a source directly from measured EM field data from a marine survey. The set of machine-readable instructions can be executable by one or more of the processing resources 476. The memory resources 478 can be coupled to the machine 474 in a wired and/or wireless manner. For example, the memory resources 478 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 478 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 476 can be coupled to the memory resources 478 via a communication path 480. The communication path 480 can be local or remote to the machine 474. Examples of a local communication path 480 can include an electronic bus internal to a machine, where the memory resources 478 are in communication with the processing resources 476 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 480 can be such that the memory resources 478 are remote from the processing resources 476, such as in a network connection between the memory resources 478 and the processing resources 476. That is, the communication path 480 can be a network connection. Examples of such a network connection can include a local area network, wide area network, personal area network, and the Internet, among others.

As shown in FIG. 4, the machine-readable instructions stored in the memory resources 478 can be segmented into a number of modules 482 and 484 that when executed by the processing resources 476 can perform a number of functions. As used herein a module includes a set of instructions included to perform a particular task or action. The number of modules 482 and 484 can be sub-modules of other modules. For example, the boundary module 484 can be a sub-module of the transformation module 482 and/or the boundary module 484 and the transformation module 482 can be contained within a single module. Furthermore, the number of modules 482 and 484 can comprise individual modules separate and distinct from one another. Examples are not limited to the specific modules 482 and 484 illustrated in FIG. 4.

Each of the number of modules 482 and 484 can include program instructions and/or a combination of hardware and program instructions that, when executed by a processing resource 476, can function as a corresponding engine as described with respect to FIG. 3. For example, the transformation module 482 can include program instructions and/or a combination of hardware and program instructions that, when executed by a processing resource 476, can function as the transformation engine 368, and/or the boundary module 484 can include program instructions and/or a combination of hardware and program instructions that, when executed by a processing resource 476, can function as the boundary engine 370 and/or profile engine.

The machine 474 can include a transformation module 482, which can include instructions to transform a vector potential of measured EM field data. The transformation module 482 can also include instructions to transform a first BVP. The transformation module can also include instructions for a series of transformations. The instructions to transform the first BVP can include instructions to remove a conductivity dependency. The instructions to estimate the boundary value for the given conductivity can include instructions to use a Hankel transform variable equal to zero, where the given conductivity can be a known conductivity of seawater and a conductivity of a subsurface.

The machine 474 can include a boundary module 484, which can include instructions to obtain a first BVP, obtain a second BVP, estimate a boundary value for a given conductivity, discretize the second BVP in distance in depth below a below a water surface and frequency, and generate a resistivity profile according to an explicit expression using the estimated boundary value. The given conductivity can be known conductivity of seawater and/or a subsurface. Generating the resistivity profile according to the explicit expression using the estimated boundary value can comprise a non-iterative computational modeling process. The instructions to obtain the first BVP can include instructions to obtain an ordinary differential equation and/or an integro-differential equation. The instructions to obtain the first BVP can also include instructions to estimate a conductivity of a marine environment as a function of depth only.

In accordance with a number of embodiments of the present disclosure, a geophysical data product may be produced. The geophysical data product may include, for example, a marine survey measurement with an estimated acquisition effect removed therefrom. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, a series of transformations can be applied to measured EM field data to yield a BVP, a first boundary condition can be determined based on at least one of the series of transformations of the measured EM field data and a measurement point, the first boundary condition can then be applied to the BVP, a second boundary condition in depth and frequency can be discretized, and then a resistivity profile can be generated for at least one source by solving the BVP according to the first and the second boundary conditions. As another example, the resistivity profile can be generated directly from measured EM field data offshore to facilitate other processing of the acquired marine survey measurement either offshore or onshore.

Figure 5:
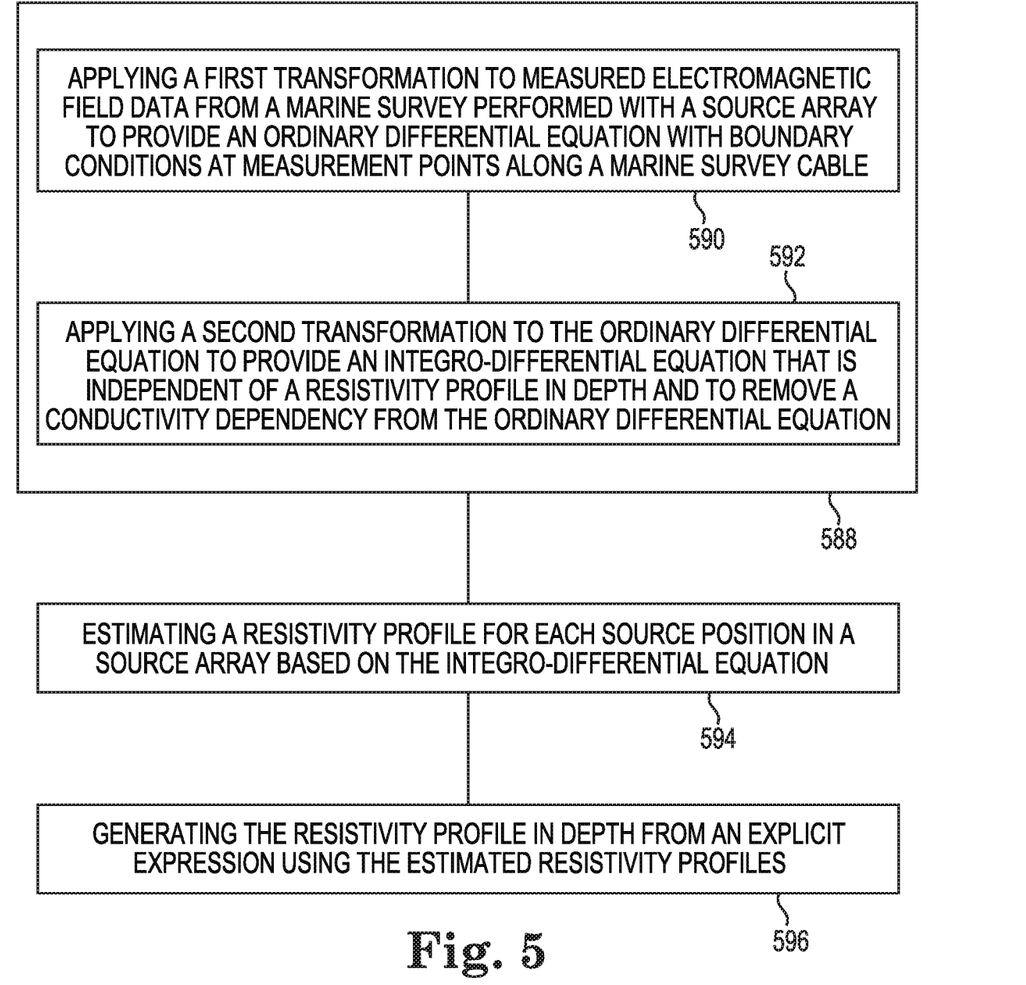
FIG. 5 illustrates a method flow diagram for generating a resistivity profile for a source directly from measured electromagnetic field data from a marine survey.

FIG. 5 illustrates a method flow diagram for generating a resistivity profile for a source directly from measured EM field data from a marine survey. At block 588, the method can include applying a series of transformations to measured EM field data to provide an ordinary differential equation with boundary conditions at measurement points along a marine survey cable. The measurement points can be offset from each source position.

At block 590, the method can include applying a first transformation to measured EM field data from a marine survey performed with a source array to provide the ordinary differential equation with boundary conditions at measurement points along a marine survey cable.

At block 592, the method can include removing a conductivity dependency from the integro-differential equation by applying a second transformation to the ordinary differential equation to provide an integro-differential equation that is independent of a resistivity profile in depth. Applying the second transformation can include rewriting the first transformation as a function of the second transformation. Removing the conductivity dependency from the integro-differential equation by applying the second transformation to the first transformation can comprise a non-iterative computational modeling process.

At block 594, the method can include estimating a resistivity profile for each source position in a source array based on the integro-differential equation.

At block 596, the method can include generating the resistivity profile in depth from an explicit expression using the estimated resistivity profiles. Generating the resistivity profile can include integrating the measured electric field data along the marine survey cable, and obtaining a boundary value from a model with a known seawater conductivity and an estimated subsurface conductivity.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
  a processing resource;
  a memory resource coupled to the processing resource, wherein the memory resource stores instructions executable by the processing resource to generate a subsurface resistivity profile as a function of depth for a surveyed area by a non-iterative computation modeling process to identify a resistivity anomaly indicative of hydrocarbons, the non-iterative computation modeling process comprising instructions to:
apply a first transformation to an x-component of a vector potential of measured electromagnetic (EM) field data from a marine survey performed with at least one source to yield a first boundary value problem (BVP);
  wherein the at least one source comprises a pair of electrodes forming a horizontal electric current dipole source;
  wherein the x-component is in a horizontal direction in-line with the horizontal electric current dipole source;
apply a second transformation to the first BVP to obtain a second BVP;
determine a first boundary condition based on at least one of the first transformation and the second transformation and a measurement point;
apply the first boundary condition to at least one of the first BVP and the second BVP;
discretize a second boundary condition in depth and frequency;
solve the second BVP according to the first boundary condition and the second discretized boundary condition; and
receive solutions to the second BVP at a plurality of measurement points, yielding the subsurface resistivity profile.

2. The system of claim 1, wherein applying the first transformation comprises applying a zero-order Hankel transformation.

3. The system of claim 2, wherein the x-component of the vector potential of the measured EM field data is in-line with a towed sensor cable and where x is a sailing direction.

4. The system of claim 1, wherein the measurement point is on a towed sensor cable or an ocean-bottom cable.

5. A non-transitory machine-readable medium storing instructions executable by a processing resource to
generate a subsurface resistivity profile as a function of depth for a surveyed area by a non-iterative computation modeling process to identify a resistivity anomaly indicative of hydrocarbons, wherein the non-iterative computation modeling process comprises instructions to
  transform an x-component of a vector potential of measured electromagnetic (EM) field data from a marine survey performed with at least one source;
  wherein the at least one source comprises a pair of electrodes forming a horizontal electric current dipole source;
  wherein the x-component is in a horizontal direction in-line with the horizontal electric current dipole source;
estimate conductivity as a function of depth to obtain a first boundary value problem (BVP);
transform the first BVP to remove a conductivity dependency of the first BVP and to obtain a second BVP;
estimate a boundary value for a given conductivity;
discretize the second BVP in depth below a water surface and frequency;
solve the discretized second BVP using the estimated boundary value; and
receive solutions to the discretized second BVP at a plurality of measurement points, yielding the subsurface resistivity profile.

6. The medium of claim 5, wherein the instructions executable to obtain the first BVP include instructions executable to obtain an ordinary differential equation.

7. The medium of claim 5, wherein the instructions executable to obtain the second BVP include instructions executable to obtain an integro-differential equation.

8. The medium of claim 5, wherein the instructions executable to estimate the conductivity comprise instructions to estimate the conductivity of a marine environment as a function of depth only.

9. The medium of claim 5, wherein the instructions executable to estimate the boundary value for the given conductivity include instructions executable to use a Hankel transform variable equal to zero.

10. The method of claim 5, wherein the given conductivity is a known conductivity of seawater and a conductivity of a subsurface.

11. A method, comprising:
generating a subsurface resistivity profile as a function of depth for a surveyed area by a non-iterative computation modeling process to identify a resistivity anomaly indicative of hydrocarbons, the non-iterative computation modeling process comprising:
  applying a first transformation to an x-component of a vector potential of measured electromagnetic (EM) field data from a marine survey performed with a source array to provide an ordinary differential equation with boundary conditions at measurement points along a marine survey cable;
  wherein each source of the source array comprises a pair of electrodes forming a horizontal electric current dipole source;
  wherein the x-component is in a horizontal direction in-line with the horizontal electric current dipole sources;
  applying a second transformation to the ordinary differential equation to:
    provide an integro-differential equation that is independent of the subsurface resistivity profile in depth; and
    remove a conductivity dependency from the ordinary differential equation; and
  estimating the subsurface resistivity profile for each source position in the source array based on the integro-differential equation.

12. The method of claim 11, wherein the measurement points are offset from each source position.

13. The method of claim 11, where applying the second transformation includes rewriting the first transformation as a function of the second transformation.

14. The method of claim 11, wherein generating the subsurface resistivity profile includes integrating the measured electric field data along the marine survey cable, and obtaining a boundary value from a model with a known seawater conductivity and an estimated subsurface conductivity.

15. The method of claim 11, further comprising:
injecting an electric current into a fluid volume; and
recording the measured EM field data with an EM receiver resulting from injecting the electric current.

16. A method of generating a geophysical data product, the method comprising:
obtaining measured electromagnetic (EM) field data from a marine survey performed with at least one source comprising a pair of electrodes forming a horizontal electric current dipole source;

generating a subsurface resistivity profile as a function of depth for a surveyed area by a non-iterative computation modeling process to identify a resistivity anomaly indicative of hydrocarbons, the non-iterative computation modeling process comprising:
  applying a first transformation to an x-component of a vector potential of the EM field data to yield a first boundary value problem (BVP), wherein the x-component is in a horizontal direction in-line with the horizontal electric current dipole source;
  applying a second transformation to the first BVP to obtain a second BVP;
  determining a first boundary condition based on at least one of the first transformation and the second transformation and a measurement point;
  applying the first boundary condition to at least one of the first BVP and the second BVP;
  discretizing a second boundary condition in depth and frequency;
  solving the second BVP according to the first and the second boundary conditions to generate the subsurface resistivity profile as a function of depth for a surveyed area to identify a resistivity anomaly indicative of hydrocarbons;
  receiving solutions to the second BVP at a plurality of measurement points, yielding the subsurface resistivity profile; and
  recording the subsurface resistivity profile on a non-transitory machine readable medium, thereby generating the geophysical data product.

17. The method of claim 16, wherein the non-transitory machine-readable medium is suitable for importing onshore.

18. The method of claim 16, wherein recording the geophysical data product comprises recording the geophysical data product offshore or onshore.

* * * * *